United States Patent
Hull

(10) Patent No.: US 11,467,075 B1
(45) Date of Patent: Oct. 11, 2022

(54) METHOD OF ESTIMATING MATERIAL PROPERTIES OF AN ELASTIC PLATE

(71) Applicant: The United States of America as represented by the Secretary of the Navy, Newport, RI (US)

(72) Inventor: Andrew J Hull, Portsmouth, RI (US)

(73) Assignee: The United States of America as represented by the Secretary of the Navy

(*) Notice: Subject to any disclaimer, the term of this patent is extended or adjusted under 35 U.S.C. 154(b) by 1056 days.

(21) Appl. No.: 16/137,902

(22) Filed: Sep. 21, 2018

(51) Int. Cl.
*G01N 3/00* (2006.01)
*G01N 3/34* (2006.01)

(52) U.S. Cl.
CPC ....... *G01N 3/34* (2013.01); *G01N 2203/0005* (2013.01); *G01N 2203/0032* (2013.01); *G01N 2203/0075* (2013.01); *G01N 2203/0282* (2013.01); *G01N 2203/0641* (2013.01); *G01N 2203/0688* (2013.01)

(58) Field of Classification Search
CPC ............. G01N 3/34; G01N 2203/0005; G01N 2203/0032; G01N 2203/0075; G01N 2203/0282; G01N 2203/0641; G01N 2203/0688
See application file for complete search history.

(56) References Cited

U.S. PATENT DOCUMENTS

| | | | | |
|---|---|---|---|---|
| 5,245,876 A * | 9/1993 | Jones | ................. | G01N 3/32 73/579 |
| 6,575,036 B1 * | 6/2003 | Huang | ................. | G01N 3/38 73/644 |
| 7,062,386 B1 * | 6/2006 | Hull | ................. | G01N 29/348 702/39 |
| 7,252,004 B2 * | 8/2007 | Fink | ................. | G01S 7/52042 600/443 |
| 8,469,891 B2 * | 6/2013 | Maleke | ................. | A61B 8/5261 73/602 |
| 11,333,472 B1 * | 5/2022 | Peterson | ................. | F42B 12/74 |
| 2004/0065152 A1 * | 4/2004 | Hull | ................. | G01N 3/32 73/579 |
| 2009/0000378 A1 * | 1/2009 | Dill | ................. | G01N 3/32 73/579 |

\* cited by examiner

*Primary Examiner* — Max H Noori
(74) *Attorney, Agent, or Firm* — James M. Kasischke; Michael P. Stanley

(57) ABSTRACT

A method is provided for increasing accuracy in measuring complex Young's modulus and complex shear modulus of a material using a processing system. The material is tested to obtain an experimental frequency response transfer function of normal displacement to input force. A model panel is developed in the processing system as a modeled frequency response transfer function. The modeled transfer function is used at a range of fixed frequencies to calculate displacements of the model panel divided by the input force while varying material parameters. The modeled frequency response transfer function is compared with the experimental frequency response transfer function to compute error function values. These values indicate the most accurate material property values as those minimizing the computed error function values.

6 Claims, 2 Drawing Sheets

METHOD OF ESTIMATING MATERIAL PROPERTIES OF AN ELASTIC PLATE

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention relates to a method for estimating the complex Young's and shear moduli using an elastic plate.

(2) Description of the Prior Art

One method to measure or estimate material properties is dynamic mechanical analysis (DMA). In dynamic mechanical analysis, a piece of material is clamped into a test machine and then periodically oscillated in such a manner that displacement and force can be measured. One or more mechanical properties are extracted from the measured displacement and force. Frequency ranges for this analysis vary, but the TA Instruments Q800 DMA machine utilizes 0.01 to 200 Hz, the Metravib DMA25 and DMA50 machines utilize 0.00001 to 200 Hz and the Bose Electro-Force™ 3100 Test Instrument operates at a maximum frequency of 100 Hz. Low frequency data from DMA analyzers is sometimes transformed to higher frequencies using a method called the WLF shift, although it is noted that this shift can be inaccurate.

Acoustic methods are sometimes used to estimate mechanical properties of solid materials. Known methods measure the phase speed and attenuation in a panel and use this data to calculate the complex dilatational wave properties which are then referred to as the "speed of sound." This method has been extended to estimate the shear properties of the tested material. It is noted that acoustic methods usually do not produce accurate results below about 15 kHz because of acoustic diffraction.

Resonant techniques to identify and measure various stiffness and loss properties have been used for many years. These are typically based on measuring the eigenvalues of a structure and comparing them to predicted eigenvalues from a model of the same structure. Measurement of Young's modulus and loss factor have been accomplished using the bar wave equation of motion and a matching experimental apparatus. This method was refined to torsional, longitudinal and flexural wave types using electrodynamic transducers. These resonant techniques require well defined eigenvalues and eigenvectors to properly work. The resonant method was further extended to estimate shear wave speeds by matching the theoretical frequency spectrum of Rayleigh-Lamb equation to experimental data in the wave-vector domain. The use of cantilever shaped beams to calculate natural frequencies and corresponding material properties is also known. There is also a known method to measure complex Young's modulus in a resonant bar using incident wave energy. This method extended the available testing frequency range to 6500 Hz.

Wave based methods have also been used to estimate mechanical parameters such as damping and loss. These methods have been performed utilizing beams. A wave fitting method is known to estimate frequency dependent material properties in thin isotropic plates. These methods have been extended to orthotropic plates in order to identify flexural stiffness parameters and principal orthotropy directions.

There remains a need to characterize the properties of panels at frequencies in the 4 kHz to 8 kHz range.

SUMMARY OF THE INVENTION

Accordingly, it is a primary object and general purpose of the present invention to provide a laboratory test method to estimate the mechanical material properties of an elastic plate.

Accordingly, there is provided a method for increasing accuracy in measuring complex Young's modulus and complex shear modulus of a material using a processing system. The material is tested to obtain an experimental frequency response transfer function of normal velocity to input force and this is subsequently converted to normal displacement divided by force. A model panel is developed in the processing system as a modeled frequency response transfer function. The modeled transfer function is used at a range of fixed frequencies to calculate displacements of the model panel divided by the input force while varying material parameters. The modeled frequency response transfer function is compared with the experimental frequency response transfer function to compute error function values. These values indicate the most accurate material property values as those minimizing the computed error function values.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the drawings and wherein.

DETAILED DESCRIPTION OF THE INVENTION

The ability to accurately measure material properties is critical to the design, modeling and analysis of most mechanical structures. These properties implicitly determine how soft or stiff the resultant structural response is to an applied force, and accurate measurements of these properties are always sought. In this invention, an inverse method to simultaneously estimate complex Young's and shear moduli for an elastic plate is formulated. It is specifically derived for the frequency range of approximately 1 kHz to 10 kHz, which is an area where the simultaneous direct measurement of Young's and shear moduli has been relatively difficult. The method begins by deriving the equations of motion for a fully elastic plate subjected to a normal circular load that is harmonic in time. An experiment is then conducted where the transfer function of normal velocity divided by input force is measured at numerous locations, which is converted into normal displacement divided by input force so that it can be compared to the model. Once this is done, an error function based on the residual between the model displacement and the measured displacement is defined and a search over real Young's modulus, loss factor of Young's modulus, real shear modulus and loss factor of shear modulus is conducted at each frequency bin. When the error function is minimized, the parameters used to formulate the model are considered the best estimate available.

Figure 1:
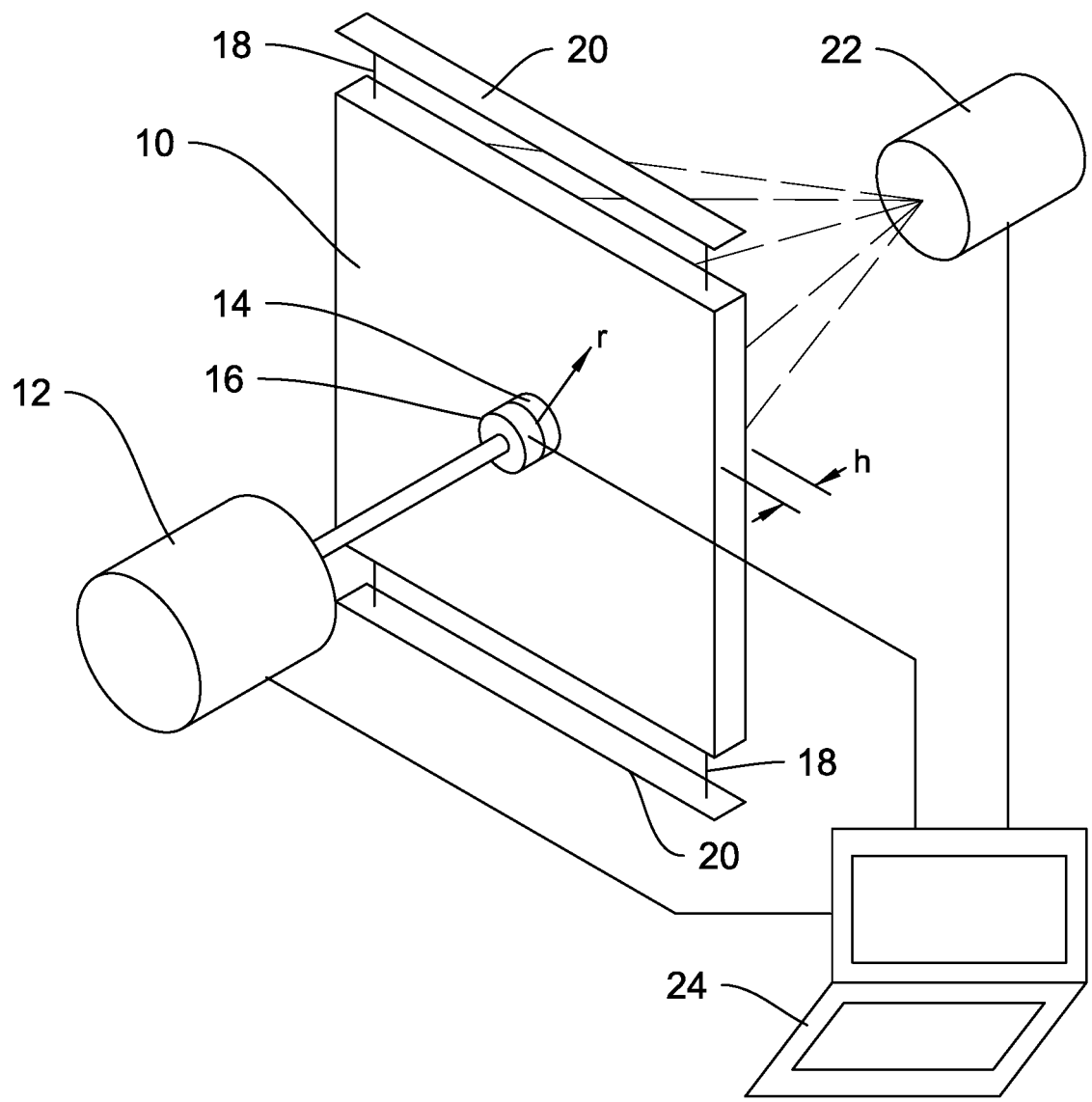
FIG. 1 is a schematic representation of a test system used in the method of the present invention.

FIG. 1 shows an embodiment of apparatus set up for determining material properties of a test panel 10. Set up includes a mechanical shaker 12 affixed to an indenter 14 that can generate mechanical wave motion in panel 10 in a direction primarily perpendicular to panel 10. Shaker 12 can have controls allowing selection of amplitude and frequency. A transducer 16 is provided between indenter 14 and shaker 12 to give a more precise measurement of the force transmitted to panel 10. Panel 10 is suspended by elastic cords 18 that are attached to a stationary frame 20. A laser velocimeter 22 is utilized to measure the transverse velocity of panel 10 at a plurality of positions on the opposite side of panel 10 from indenter 14. Signals from the laser velocimeter 22 and force transducer 16 are transmitted to a processor 24. Optionally, mechanical shaker 12 can be joined to processor 24 for controlling the input frequency and amplitude to indenter 14. Processor 24 includes a spectrum analyzer routine that performs a fast Fourier transform on the time domain point velocity data from laser velocimeter 22 and force data from force transducer 16. Processor 24 can then provide a frequency response transfer function between normal direction velocity divided by indenter 14 input force. These transfer functions are divided by $i\omega$ to convert them into normal displacement divided by force.

A cylindrical coordinate system is defined such that $r=0$ is at the center of indenter 14. The panel side where indenter 14 is attached to is $z=-h$, where h is the thickness of panel 10 and the side the laser velocimeter 22 interrogates is $z=0$. Panel 10 is modeled as an elastic solid and the equation of the motion of normal displacement caused by an indenter force $F_0$ is given by $$w(r,0) = \int_0^\infty \frac{\left[c_4 \sin\left(h\sqrt{k_d^2-k_r^2}\right) + c_5 \sin\left(h\sqrt{k_s^2-k_r^2}\right)\right] F_0 J_1(k_r R) J_0(k_r r)}{2\mu\Delta\pi R} dk_r, \quad (1)$$

where $$\Delta = c_1[\cos(h\sqrt{k_d^2-k_r^2})\cos(h\sqrt{k_s^2-k_r^2})-1] + c_2 \sin(h\sqrt{k_d^2-k_r^2})\sin(h\sqrt{k_s^2-k_r^2}), \quad (2)$$

$$c_1 = -8k_r^2\sqrt{k_d^2-k_r^2}\sqrt{k_s^2-k_r^2}(2k_r^2-k_s^2)^2, \quad (3)$$

$$c_2 = (2k_r^2-k_s^2)^4 + 16k_r^4(k_r^2-k_d^2)(k_r^2-k_s^2), \quad (4)$$

$$c_4 = 8k_r^2 k_s^2 \sqrt{k_s^2-k_r^2}(k_r^2-k_d^2) \quad (5)$$

and $$c_5 = -2k_s^2 \sqrt{k_d^2-k_r^2}(2k_r^2-k_s^2)^2. \quad (6)$$

In equation (1), $w(r,0)$ is the normal displacement of the panel at any location r and $z=0$, $k_r$ is the radial wavenumber, $J_1$ is a first order, first kind Bessel function, $J_0$ is a zeroth order, first kind Bessel function, R is the radius of indenter 14, $\mu$ is the second Lamé parameter (also called the shear modulus) and is sometimes denoted G, $k_d$ is the dilatational wavenumber and $k_s$ is the shear wavenumber. R is preferably the same as the thickness of the panel. The dilatational wavenumber is calculated using $$k_d = \frac{\omega}{c_d} \quad (7)$$

and the shear wavenumber is calculated using $$k_s = \frac{\omega}{c_s} \quad (8)$$

where $c_d$ is the dilatational wave speed given by $$c_d = \sqrt{\frac{\lambda + 2\mu}{\rho}} \quad (9)$$

and $c_s$ is the shear wave speed given by $$c_s = \sqrt{\frac{\mu}{\rho}} \quad (10)$$

where $\lambda$ and $\mu$ are Lamé parameters and $\rho$ is the density of panel 10. The relationship between the Lamé parameters and Young's and shear modulus is $$\lambda = \frac{G(E-2G)}{3G-E} \quad (11)$$

and $$\mu = G \quad (12)$$

where E is Young's modulus. Equation (1) can be numerically integrated to yield numerical results for specific values of complex Young's modulus E and complex shear modulus G. Implicit in Equation (1) is multiplication by the time harmonic exponential term $\exp(i\omega t)$.

The parameter estimation method consists of testing panel 10 utilizing the apparatus given in FIG. 1 and comparing its experimental response to the theoretical model listed in Equation (1). The model of the normal displacement is now calculated at a fixed frequency with four free parameters that are allowed to vary: real part of Young's modulus, imaginary part of Young's modulus, real part of the shear modulus and the imaginary part of the shear modulus and compared to the data using the error function $$\Delta_{ijkm}[Re(E_i), Im(E_j), Re(G_k), Im(G_m)] = \qquad (13)$$
$$\frac{1}{2N}\sum_{n=1}^{N}\left|\frac{||w_M[r_n, Re(E_i), Im(E_j), Re(G_k), Im(G_m)]| - |w_E(r_n)||}{(|w_M[r_n, Re(E_j), Im(E_j), Re(G_k), Im(G_m)]|)}\right| +$$
$$\frac{1}{2N}\sum_{n=1}^{N}\left|\frac{|arg\{w_M[r_n, Re(E_i), Im(E_j), Re(G_k), Im(G_m)]\}| - |arg\{w_E(r_n)\}|}{|arg\{w_M[r_n, Re(E_j), Im(E_j), Re(G_k), Im(G_m)]\}|}\right|$$

where i, j, k and m are indices of the free parameters, "Re" denotes the real part, "Im" denotes the imaginary part, "arg" denotes the argument of a complex function, the subscript M denotes the model, the subscript E denotes the experimental data, the counter n corresponds to the data or the model at fixed radial location $r_n$, and there are N total spatial points in each frequency bin. To increase the accuracy of the analysis, the argument, arg, of the function is the unwrapped phase angle rather than the wrapped phase angle (or the principal value of the function). (Phase angle can be depicted using a number of limits as each one can have a multiple of $2\pi$ added or subtracted to its value and retain all of the information. When it is shown between $-\pi$ and $+\pi$, this is called the principle value. Unwrapping the phase angle normally produces a smooth function that does not have discontinuities.) The term $\Delta_{ijkm}$ is the sum of the absolute value of normalized residuals. When this term is minimized, the parameters used to formulate the model are considered the best estimate from the available data.

The following ranges of the search are placed on the free parameters $$Re(G_{min}) \leq Re(G_k) \leq Re(G_{max}), \qquad (14)$$

$$\eta_{min}^{(G)} \leq Im(G_m)/Re(G_k) \leq \eta_{max}^{(G)}, \qquad (15)$$

$$Re(E_{min}) \leq Re(E_i) \leq Re(E_{max}) \qquad (16)$$

and $$\eta_{min}^{(E)} \leq Im(E_j)/Re(E_i) \leq \eta_{max}^{(E)}, \qquad (17)$$

where the subscript min denotes a minimum value, max denotes a maximum value, $\eta^{(E)}$ is the structural loss factor of Young's modulus and $\eta^{(G)}$ is the structural loss factor of the shear modulus. Note that for this work, a positive sign is chosen for the time harmonic exponential, which enforces the following sign conventions:

$$G = Re(G) + i\, Im(G) = Re(G)[1 + i\eta^{(G)}] \qquad (18)$$

and $$E = Re(E) + i\, Im(E) = Re(E)[1 + i\eta^{(E)}], \qquad (19)$$

where the values of Re(G) and Re(E) are greater than zero and the values of Im(G), Im(E), $\eta^{(G)}$ and $\eta^{(E)}$ are greater than or equal to zero.

In addition to the ranges of the free parameters, the search space has additional constraints that must be satisfied to follow the governing laws of linear isotropic elasticity theory. The real part of the Lamé parameter $\lambda$ has to be positive definite, and this equation is $$Re(\lambda) = Re\left[\frac{G(E-2G)}{3G-E}\right] > 0, \qquad (20)$$

and the imaginary part of the Lamé parameter $\lambda$ has to be non-negative, written as $$Im(\lambda) = Im\left[\frac{G(E-2G)}{3G-E}\right] \geq 0. \qquad (21)$$

The real part of the dilatational parameter $\lambda+2\mu$ has to be positive definite, and this equation is $$Re(\lambda + 2\mu) = Re\left[\frac{G(4G-E)}{3G-E}\right] > 0, \qquad (22)$$

and the imaginary part of the dilatational parameter $\lambda+2\mu$ has to be non-negative, written as $$Im(\lambda + 2\mu) = Im\left[\frac{G(4G-E)}{3G-E}\right] \geq 0. \qquad (23)$$

The real part of Poisson's ratio has to be less than one half, written as $$Re(\upsilon) = Re\left(\frac{E-2G}{2G}\right) < 0.5. \qquad (24)$$

An experiment was undertaken utilizing the set up given in FIG. 1, except that processor 24 was not joined to shaker 12. Panel 10 was Cytech Industries EN-6 measuring 0.780 m by 0.755 m by 0.0254 m thick and having a mass of 16.6 kg. EN-6 is a two-part urethane that consists of a mixture of a prepolymer and a curing agent. Laser vibrometer 22 was a Polytec LDV PSV-400 Doppler scanning laser velocimeter, and the shaker was a Wilcoxon Model F3/Z602WA. Indenter 14 had a radius of 0.0254 m (1 in). A linear strip of data was collected consisting of 79 measurement locations. The middle of the data strip intersected the middle of indenter 14. The point-to-point spacing of adjacent data points was 0.00954 m (0.375 in). Vibrometer 22 was located 2.485 m from panel 10 and the room temperature was 18.8° C. The data was collected from 4 kHz to 8 kHz in 250 Hz increments.

The data from panel 10 was processed using a search algorithm with Equation (13) as the error function. Initially, a wide range of minimum and maximum values were used to identify the area of the local minimum. These were $G_{min}=10^6$ Pa, $G_{max}=10^8$ Pa, $\eta_{min}^{(G)}=0.01$, $\eta_{max}^{(G)}=0.50$, $E_{min}=10^7$ Pa, $E_{max}=10^9$ Pa, $\eta_{min}^{(E)}=0.01$ and $\eta_{max}^{(E)}=0.50$ and this search was conducted at 3 and 4 kHz. These minima were used to define a narrower search area where the refined estimates all have two significant digits of precision. This smaller search area was $G_{min}=4.0\times 10^7$ Pa, $G_{max}=5.5\times 10^7$ Pa, $\eta_{min}^{(G)}=0.11$, $\eta_{max}^{(G)}=0.21$, $E_{min}=1.2\times 10^8$ Pa, $E_{max}=1.6\times 10^8$ Pa, $\eta_{min}^{(E)}=0.12$ and $\eta_{max}^{(E)}=0.22$ and was applied to all frequency bins from 4 kHz to 8 kHz.

Figure 2:
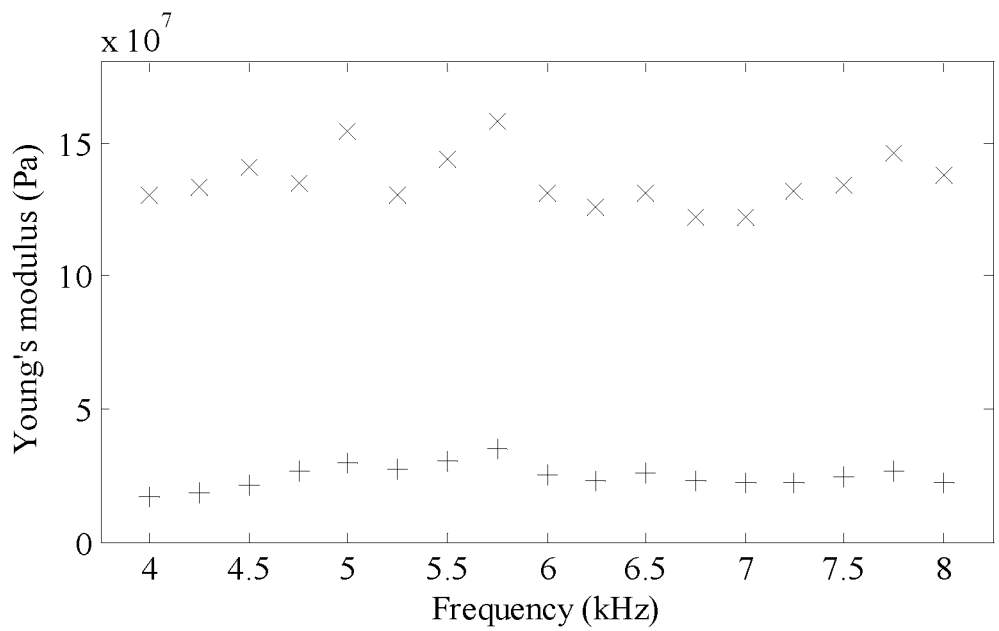
FIG. 2 is an illustration of the results of estimated Young's modulus versus frequency.
Figure 3:
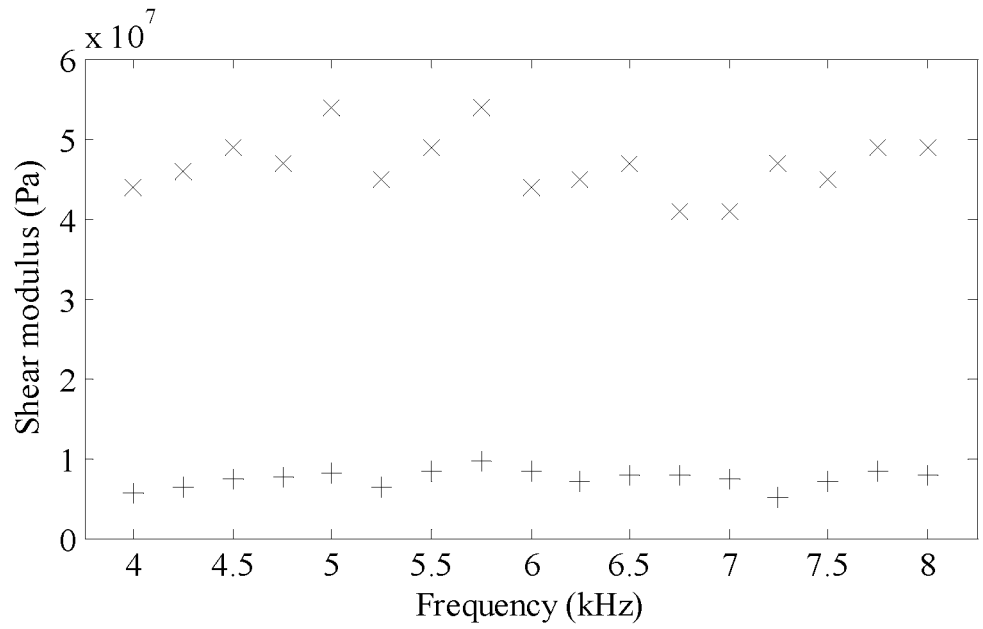
FIG. 3 is an illustration of the results of estimated shear modulus versus frequency.

FIG. 2 is a graph showing the real part (x markers) and imaginary part (+ markers) of the estimated Young's modulus versus frequency for panel 10, and FIG. 3 is a graph showing the real part (x markers) and imaginary part (+ markers) of the estimated shear modulus versus frequency for the panel. These plots illustrate that the method is producing stable estimates of the material properties.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A method for increasing accuracy in measuring the complex Young's modulus and the complex shear modulus of a material using a processing system comprising the steps of:

testing a panel made from the material to obtain an experimental frequency response transfer function utilizing normal displacement divided by an input force applied to the panel;

developing a model panel in a processing system as a panel of the material having the same dimensions as the tested panel and modeling the normal displacement as a function of positions on the modeled panel, the developed model being a modeled frequency response transfer function;

utilizing the modeled frequency response transfer function at a range of fixed frequencies to calculate normal displacements of the developed model panel divided by the input force while varying the real part of the complex Young's modulus, the imaginary part of the complex Young's modulus, the real part of the shear modulus, and the imaginary part of the shear modulus;

comparing the modeled frequency response transfer function against the experimental frequency response transfer function at each frequency of the range of fixed frequencies to compute error function values; and indicating the most accurate complex Young's modulus and complex shear modulus for each frequency as being those minimizing the error function values computed in the step of comparing.

2. The method of claim 1, wherein the step of testing a panel made from the material comprises:

suspending the panel made from the material, the panel having a first major surface and a second major surface;

applying a periodic force to the suspended panel first major surface in a direction normal to the suspended panel first major surface, the periodic force having a known amplitude and frequency;

determining a force magnitude over time applied by the periodic force at the suspended panel first major surface;

measuring normal displacements over time at a plurality of points on the panel second major surface while applying the periodic force;

changing the frequency of the periodic force in the step of applying a periodic force, and repeating the steps of determining a force magnitude over time and measuring normal displacements associated with the frequency; and combining the measured normal velocities and determined force to obtain the frequency response transfer function.

3. The invention of claim 2, wherein the force magnitude over time is determined by estimating the applied periodic force.

4. The invention of claim 2, wherein the force magnitude over time is measured by utilizing a transducer positioned near the location of applying a periodic force on the suspended panel first major surface.

5. The invention of claim 2, wherein normal displacements over time are measured utilizing a laser vibrometer.

6. The invention of claim 2, wherein normal displacements are obtained by measuring velocities and converting these into normal displacements by dividing the measured velocities by $i\omega$ where $i$ is the square root of $-1$ and $\omega$ is the frequency in radians per second.

* * * * *